United States Patent

Barbieri

[15] 3,689,123

[45] Sept. 5, 1972

[54] TRACK LAYING ATTACHMENT FOR A VEHICLE

[72] Inventor: Louis C. Barbieri, 520 South Idaho St., Dillon, Mont. 59725

[22] Filed: Sept. 10, 1970

[21] Appl. No.: 71,062

Related U.S. Application Data

[63] Continuation of Ser. No. 33,840, May 1, 1970, abandoned.

[52] U.S. Cl. ................................... 305/29, 180/9.5
[51] Int. Cl. ............................................. B62d 55/04
[58] Field of Search .................. 180/5 A, 9.5; 305/29

[56] References Cited

UNITED STATES PATENTS

| | | | |
|---|---|---|---|
| 1,449,036 | 3/1923 | Feden | 180/5 A |
| 3,590,935 | 7/1971 | Celia | 305/29 |

FOREIGN PATENTS OR APPLICATIONS

| | | | |
|---|---|---|---|
| 239,868 | 2/1946 | Switzerland | 180/9.5 |
| 1,187,923 | 3/1959 | France | 180/9.5 |

*Primary Examiner*—Richard J. Johnson
*Attorney*—Lothrop & West

[57] ABSTRACT

A track laying attachment is designed for application to a vehicle having a wheel hub rotatable about an axis and having a driving plate from which a plurality of studs project axially outward, the studs being arranged in a circle of predetermined diameter. The attachment has a coaxial drum with a circular cylindrical wall having an interior diameter greater than said predetermined diameter. At the inboard end of the drum in a driving wall with apertures receiving said studs and an inboard driving sprocket larger than the outside of said drum wall. At the outboard end of the drum is a ring having a central opening larger in diameter than said predetermined diameter and an outboard driving sprocket larger than the outside of the drum wall. A track laying frame structure has axially spaced bearings engaging the outside of the drum between the inboard and outboard sprockets. A track belt engages the track laying frame structure and the inboard and outboard sprockets.

9 Claims, 5 Drawing Figures

INVENTOR.
Louis C. Barbieri

INVENTOR.
LOUIS C. BARBIERI
BY Lothrop + West
ATTORNEYS

TRACK LAYING ATTACHMENT FOR A VEHICLE

This application is a continuation of my copending application having the same title and filed May 1, 1970 with Ser. No. 33,840 now abandoned.

With the current increase in interest in vehicles especially for use in rugged country either on snow or off of the pavement or in sand and in comparable rough environments, there is a need for providing different traction devices to the vehicle in place of the wheels thereof. There are various devices of this sort known in the prior art, but so far as I know most of these are of such complex mechanical construction that they require a substantial rebuilding of the initial vehicle before they can be utilized.

It is therefore an object of my invention to provide a track laying attachment which can readily be put into position upon removal of the usual vehicle wheel and tire and without the use of any special equipment, machinery or tools except the tools that are customarily available with the vehicle itself.

Another object of the invention is to provide a track laying attachment for a vehicle having an especially strong and sturdy construction so that the vehicle weight can be carried at a somewhat greater tread width than is customarily the case.

Another object of the invention is to provide a track laying attachment that can be applied to a vehicle with only the removal of the normal vehicle wheel.

A further object of the invention is to provide a track laying attachment in which the tread of the vehicle is extended laterally for better stability than normal on poorer than normal supporting surfaces.

Another object of the invention is to provide a generally improved track laying attachment.

Other objects, together with the foregoing, are attained in the embodiment of the invention illustrated in the accompanying drawings and described in the accompanying description. In these drawings.

Figure 3:
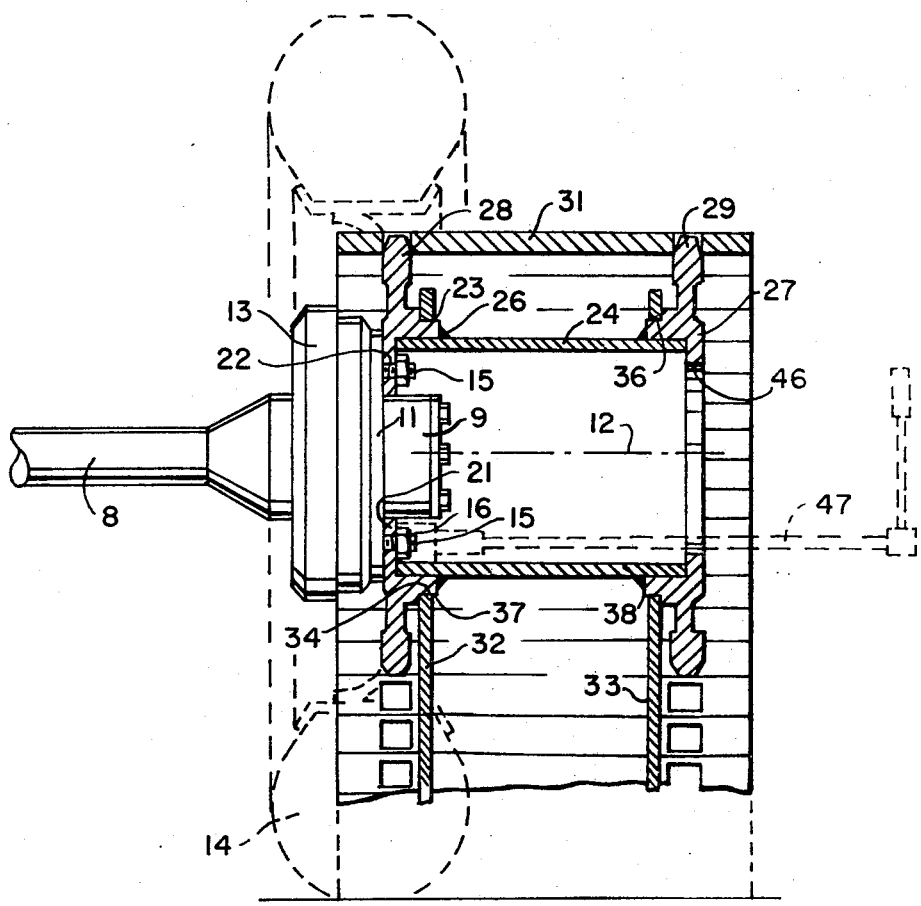
FIG. 3 is a cross-section to an enlarged scale, the plane of section being indicated by the line 3—3 of FIG. 1.

A typical vehicle to which the track laying attachment of the invention is normally applied includes a customary frame 6 beneath the vehicle body 7. The frame rests upon an axle 8 (FIG. 3) carrying a hub 9 including a plate 11 disposed with its general plane normal to the axis 12 of rotation of the plate and hub 9. Usually a brake drum 13 is situated alongside the plate 11. As shown in dotted lines in FIG. 3, it is customary to have a ground-engaging rubber tire 14 mounted on a removable wheel disc which has apertures therein to receive studs 15 and nuts 16 or cap screws engaging the plate 11 and having their axes parallel to the axis 12 and arranged in a bolt circle of a predetermined diameter.

Pursuant to the present invention, the wheel nuts 16 are removed, thus exposing the plate 11 and studs 15 when the tire 14 and wheel are detached. In place thereof I provide a drum including a driving wall 21 designed to be centered on the hub 9 and having a plurality of apertures 22 therethrough in exactly the same bolt circle pattern as the wheel apertures. The wall 21 fits over the studs 15 and is secured by the nuts thereon or receives cap screws if they are used instead of studs and nuts. The driving wall 21 extends normal to the axis 12 and preferably is formed with a circular, coaxial flange 23.

Fixed on the flange 23 to project outboard therefrom or away from the driving wall 21 is a circular cylindrical drum wall 24 concentric with the axis 12. The drum wall 24 is fixed by welding 26 to the flange 23 and is stiffened by welding to an outboard ring 27. The drum, near the inboard junction of the drum wall and the driving wall 21 and near the outboard junction of the drum wall 24 and the ring 27, around the periphery carries inboard driving means 28 and outboard driving means 29. In this instance each driving means is in the form of sprocket teeth designed to interengage with a ground-engaging track belt 31 of the usual construction. The track belt is trained around and is partly carried by frame plates 32 and 33. These are provided with axially spaced bearing means in the form of journal openings 34 and 36 designed to rotate on and relative to bearing surfaces 37 and 38 on the flange 23 and the ring 27. This construction allows the track laying unit including the supporting plates to rock freely around the axis 12.

Figure 1:
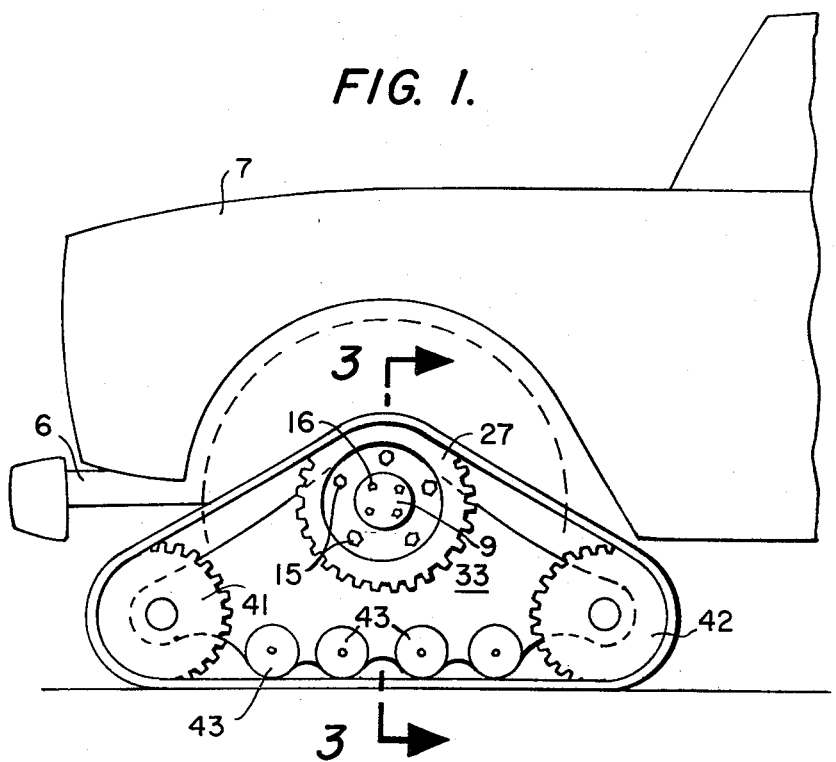
FIG. 1 is a side elevation, partly diagrammatic, of the forward end of a vehicle normally provided with a rubber-tired wheel but in this instance provided with a track laying attachment pursuant to the invention.
Figure 2:
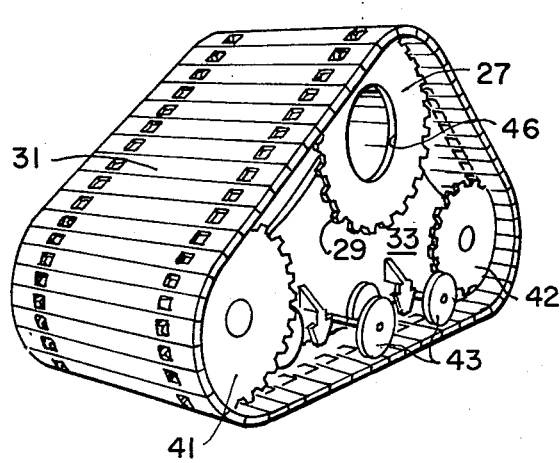
FIG. 2 is an isometric view showing in perspective and somewhat diagrammatically a track laying attachment pursuant to the invention.

It is customary to provide on the plates 32 and 33, as shown in FIGS. 1 and 2, a number of auxiliary sprockets 41 and 42 as well as idler wheels 43 cooperating with the track belt. Since these form no part of the present invention they are not described in detail, it being sufficient that the plates 32 and 33 serve as the rocking frame for a track laying attachment.

Particularly pursuant to the invention, the circular cylindrical drum wall 24 has an internal diameter greater than the predetermined diameter of the bolt circle for the studs 15. Also the ring 27 has a central opening 46 nearly of the same diameter as the interior of the drum wall 24 and larger than the bolt circle. It is feasible for a user to reach in through the opening 46, to position nuts on the studs and to position the standard style of wrench 47 on the nuts 16 to fasten them. The entire track laying mechanism is thus mounted on the standard hub 9 and against the plate 11. This provides a cantilevered arrangement of the track attachment and substantially widens the vehicle tread. The size of the drum is sufficient so that the additional forces over those normally imposed are properly transmitted and borne so that the cantilevered drum arrangement is feasible. Since similar track laying mechanisms on opposite sides of the vehicle are considerably farther apart than the normal wheels, the lateral stability of the vehicle is increased and the track laying attachment, particularly when replacing steering wheels, does not in most instances in any way interfere with the normal body 7 of the vehicle.

When the track laying attachment is no longer required it is then sufficient simply to reintroduce the tool 47 through the opening 46, remove the fastening nuts 16 from the studs 15, withdraw the track laying frame and track and reposition the tire and wheel in the normal location.

Figure 4:
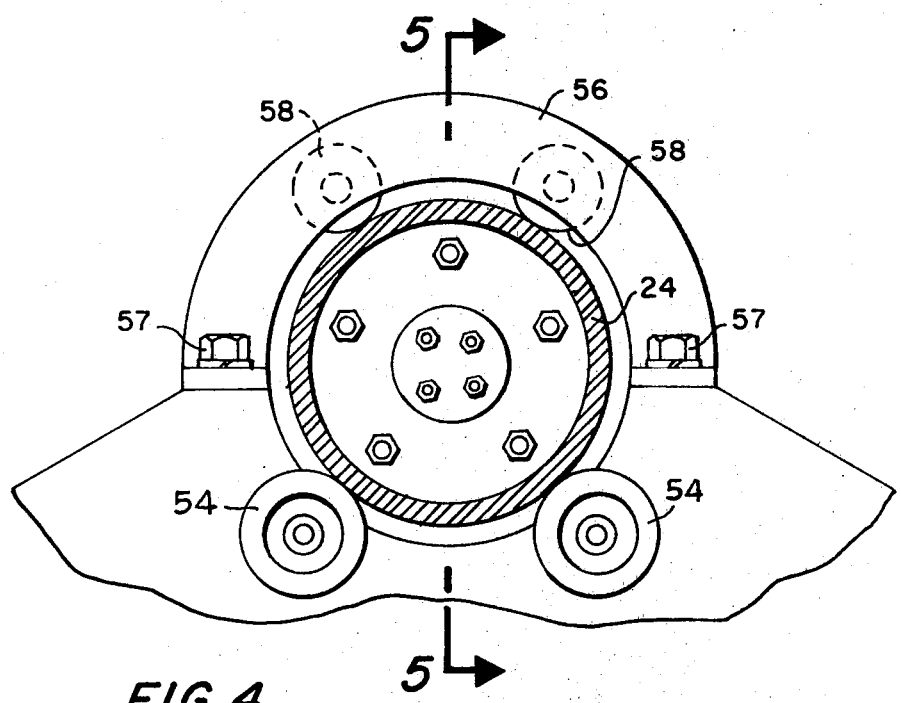
FIG. 4 is a transverse cross-section through a modified bearing construction cooperating with the drum wall, the plane of section being indicated by the line 4—4 of FIG. 5.
Figure 5:
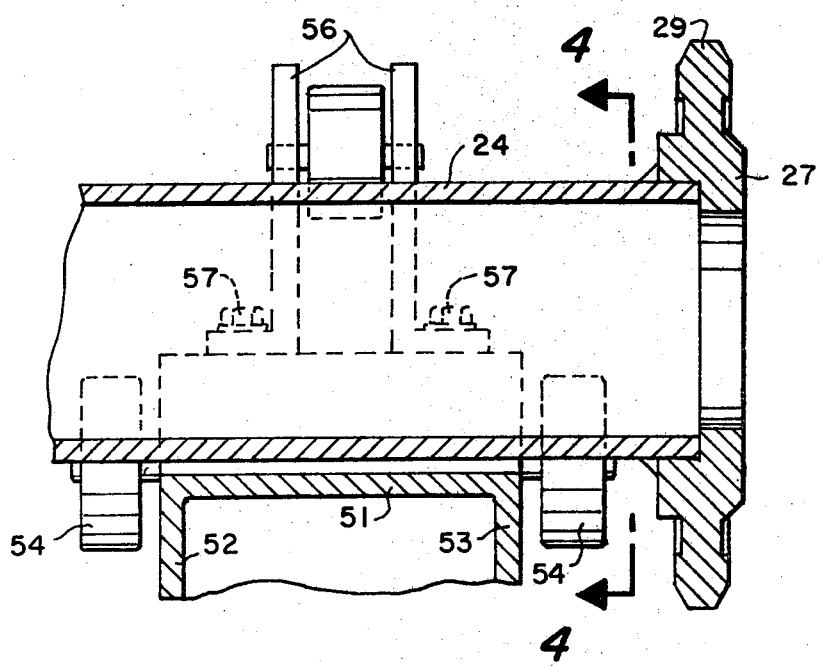
FIG. 5 is a cross-section of the structure of FIG. 4, the plane of section being indicated by the line 5—5 of FIG. 4.

In some instances, while the drum and the related mechanism remains about the same, it is desired to employ a special bearing arrangement as shown in FIGS. 4 and 5. Instead of the frame plates 32 and 33, there is provided a frame casting 51 having walls 52 and 53. Each wall carries one pair of bearing rollers 54 against which the drum wall 24 bears. A double yoke 56 is detachably fastened by bolts 57 to the frame casting 51 and carries central bearing rollers 58 also pressing against the drum wall 24. The remaining parts of the structure are substantially as previously described, but the bearing arrangement of FIGS. 4 and 5 is somewhat more economical and lends itself to ready mounting and dismounting.

What is claimed is:

1. A track laying attachment for a vehicle having a wheel hub with a plate normal to the axis of rotation of the hub and with a plurality of studs arranged in a circle of predetermined diameter concentric with said axis and projecting axially outward from said plate comprising a drum including a driving wall normal to said axis and having apertures adapted to receive said studs, a circular cylindrical coaxial drum wall having an inboard end fixed on and cantilevered outwardly from said driving wall to an outboard end, the inside of said drum wall being larger in diameter than said circle, an inboard driving means fixed to said drum adjacent the inboard end of said drum wall, an outboard driving means fixed to said drum adjacent the outboard end of said drum wall, means forming a track laying frame, wheels on said track laying frame, a belt trained around said wheels and said driving means, and axially spaced bearing members on said track laying frame engaging the outside of said drum plate between the inboard and outboard driving means thereon.

2. A track laying attachment as in claim 1 in which said outboard means on said drum wall has a central opening therethrough larger than said circle.

3. A track laying attachment as in claim 1 in which said tracklaying frame encompasses said drum wall and includes two portions separable in a plane parallel to said axis, said bearings are on said two portions and fasteners removably secure said two portions together.

4. A track laying attachment as in claim 1 in which said bearing members include rollers running on said drum wall.

5. A track laying attachment for a vehicle having a wheel hub with a plate normal to the axis of rotation of the hub comprising an annular driving wall extending normal to said axis, cooperating means engaging said plate and driving wall to fix said wall for rotation with said hub, a hollow drum having its axis concentric with the axis of rotation of the hub fixed at one end for rotation with said driving wall, first track driving means on the periphery of said driving wall, an outboard annular driving ring concentric with said axis fixed to the opposite end of said drum, second track driving means on the periphery of said ring, a tracklayer frame surrounding said drum and having parallel plates spaced apart and both normal to said axis, track sprockets mounted for rotation in said plates, at least one of said track sprockets being below and forward of said drum and at least one of said track sprockets being below and behind said drum, a track extending around the outside of said track driving means and said track sprockets, and bearing means on said frame engaging said drum to transmit weight imposed by said wheel hub through said drum and said frame plates to said track.

6. An attachment according to claim 5 in which said bearing means comprises a plurality of rollers rotatably mounted in said frame, at least two of said rollers engaging the top of said drum and two of said rollers engaging the under side of said drum.

7. An attachment according to claim 6 in which there are two rollers on the under side of said drum outboard of said frame and two rollers on the under side of said drum inboard of said frame.

8. An attachment according to claim 7 in which said two rollers engaging the top of said drum are midway in distance between the inboard and outboard rollers engaging the under side of said drum.

9. A tracklaying attachment for a vehicle having a hub and a hub plate comprising an elongated drum having an inboard sprocket at one end thereof and an outboard sprocket at the other end thereof, means within said drum and accessible from the outboard end of said drum for removably securing the inboard end of said drum to said hub plate, a tracklaying frame encompassing said drum, means for journalling said frame on the outside of said drum between said sprockets, and a ground-engaging belt trained around said frame and engaging said sprockets.

* * * * *